United States Patent Office 2,739,099
Patented Mar. 20, 1956

2,739,099

PROCESS OF TREATING ADRENOCORTICO-TROPHIC HORMONE SUBSTANCES

Lottie J. Walaszek, Chicago, Ill., assignor to Armour and Company, Chicago, Ill., a corporation of Illinois No Drawing. Application July 3, 1950,
Serial No. 172,011

4 Claims. (Cl. 167—74)

This invention relates to an adrenal gland stimulating substance and method of preparing the same. The invention is particularly useful in the preparation and purification of an adrenocorticotrophic hormone substance and in the production of a final product having a greatly increased activity.

An object of the invention is to produce a dry small molecular weight adrenocorticotrophic hormone substance of high potency which is readily dialyzable. Yet another object is to produce such a dry hormone substance which is non-precipitable in trichloroacetic acid and having a potency from twenty to forty times standard. A still further object is to provide a process for breaking up the molecules providing or associated with the activity and fractionating the fragments of the molecules to retain the bulk of the activity in a state of high purity and potency and in a dry and stable condition. Yet another object is to provide a method and means for separating trichloroacetic acid used in the precipitation of the large molecular weight material, with the salts thereof, from the activity-containing substance so as to produce a stable and dry final product. A still further object is to provide effective and relatively brief steps for separating the product containing the activity from acids, salts and other contaminants. Yet another object is to provide a method of high efficiency for the purification and preparation of a high potency adrenocorticotrophic hormone substance. Other and more specific objects will appear as the specification proceeds.

In one embodiment of my invention, I carry on a controlled enzymatic digestion of protein material containing the adrenocorticotrophic hormone. Trichloroacetic acid may then be employed to precipitate inert materials from the digested mixture. I then employ an organic solvent to further remove contaminating substances including trichloroacetic acid. In this operation I prefer to employ an aliphatic ether such as diethyl ether. The activity is then separated by a short dialysis step, the residual trichloroacetic acid and its salts passing through the membrane and the bulk of the activity being retained and recovered. The activity thus recovered may be lyophilized or dried in any suitable manner.

If the trichloroacetic acid or its salts were to be retained with the hormone substance, a stable dry product could not be obtained. By the repeated washings with ether, followed by a relatively brief dialyzing operation of one-half hour to two hours, I find that there is an effective separation of the great bulk of the hormone substance so that it is recovered practically free of the acid and salts and may be readily dried to form a stable product of exceedingly high potency.

Alternatively, the activity may be separated from the inert material by a dialysis of 18 or more hours following the short one-half hour to two hour dialysis. The dialysate may then be shell frozen and lyophilized.

In the above process, I prefer to keep the pH of the material during the digestion step below pH 4.0, and to employ proteolytic enzymes which are effective in the ranges, say, from pH 1.0 to pH 5.0. Pepsin has proved to be very satisfactory, but other enzymes such as cathepsin and other similar enzymes, may be employed.

The treatment of the digested material with trichloroacetic acid brings about a selective precipitation of inert materials, and I believe that most of the remaining large molecules of the hormone substance, which are not broken down in the digestion step, are precipitated by the action of the trichloroacetic acid.

The unprecipitated material containing the mass of the activity is then subjected to repeated extractions or washings with ether for the removal of the trichloroacetic acid. Other organic solvents which will not dissolve the adrenocorticotrophic hormone substance but will remove the trichloroacetic acid may be used, as for example, benzene, toluene, etc.

In the dialysis step, the material may be dialyzed through a cellophane bag or similar membrane (for example, the ordinary thin cellophane tubing manufactured by the Visking Co.), and preferably for a period of from one-half hour to two hours. Excellent results have been obtained in a dialyzing operation of about one hour and in which substantially all of the residual trichloroacetic acid and its salts, together with other impurities, are removed from the bulk of the active substance.

The bulk of the active material, which does not pass through the membrane during this short dialysis, may now be recovered in dry form. I prefer to lyophilize the material.

The final product is found to have a potency of from twenty to forty times standard. The term "standard," as used herein, is the generally-accepted standard which was adopted by The Technical Advisory Committee to the Study Section for Metabolism and Endocrinology of the National Institutes of Health. (The standard so adopted is represented by a lot of material which has been set aside by Armour and Company and which is designated for identification (LA1A).) This standard is approximately that of a physically-chemically pure hormone extracted from the pituitary glands and described by Sayers, Sayers and Woodbury in Endocrinology, volume 42, No. 5, May 1948, page 385.

As a starting material for the process, I may use any protein substance containing the adrenocorticotrophic hormone. For example, I may use a semi-purified fraction of the anterior pituitary glands of animals such as hogs, cattle, sheep, and other animal pituitary glands, including also pituitary glands of whales. In a number of the operations I have employed as a starting material the final product described by Joseph D. Fisher et al. in the copending application, Serial No. 122,588, for Adrenal Gland Stimulating Concentrate and Method for the Preparation Thereof, now abandoned, and in some of the examples I have referred to this product as the "Fisher product." This product has generally about twice the potency of standard. However, other products containing the adrenocorticotrophic hormone substance, either in a relatively high or low potency, may be employed as the starting material.

A specific example of the process of preparing Fisher product as described in said application Serial No. 122,588 may be set out as follows: The crude pituitary glands, immediately after being removed, are frozen and kept in a frozen condition until they are ready to be processed. I then prefer to grind the glands with Dry Ice and then after adding a solution of an organic solvent, I thaw the frozen glands as rapidly as possible. The thawing glands are extracted in an aqueous medium which preferably contains acetone and at a pH of about 1.5. The meat may be separated from the filtrate in a centrifuge, or other suitable means. The filtrate may then be treated with additional acetone to bring the percentage of acetone to about 90%, at which point precipitation occurs. The precipitate is separated from the liquor, dissolved in water, and subsequently dried. The powder thus obtained is extracted with 0.1 N solution of dibasic sodium phosphate and the material separated in a centrifuge. The supernatant material remaining after separation may be ½ saturated with ammonium sulphate to form a precipitate and again centrifuged. The precipitate may be dialyzed for three days in the cold to remove the ammonium sulphate. In this step, it is found that the active substance does not dialyze out. The material is then subjected to hydrolysis and preferably to an acid hydrolysis with hydrochloric acid and at a pH below 1.5 and boiled for about two and one-half hours. The acid-treated hormone substance is brought to a pH above 4.0 and dialyzed to remove the excess salts.

The digestion step is carried on effectively at temperatures of from 20° to 40° C. and the time may extend from one to seventy-two hours. However, I find that optimum results are obtained usually in about two hours.

The amount of trichloroacetic acid may be varied depending upon the specific material being treated, but I usually employ from 1 to 4 grams of acid per gram of the original suspended material.

In the washing of the supernatant material, after the selected precipitation employing trichloroacetic acid, I have found that from 25 to 50 volumes of ether are usually needed to properly wash the substance. I prefer to use about 30 volumes, but it will be understood that this amount may vary, depending upon whether a batchwise or continuous counter-current system is employed.

The dialysis may be carried on at a temperature of from 5° to 60° C. and preferably in a period of from one-half to two hours. I prefer to operate at room temperatures in carrying out the dialysis and usually best results are obtained in about one-half hour.

The adrenocorticotrophic hormone concentrate obtained as a product had a pH above 2.8 and was readily dialyzable, the hormone having a molecular weight less than that of the adrenocorticotrophic hormone occurring naturally in the pituitary glands and as described by Sayers, Sayers and Woodbury in the above mentioned article. The potency was considerably greater than the potency of said physically-chemically pure adrenocorticotropic hormone extracted from the pituitary glands.

Specific examples of the process may be set out as follows:

*Example 1*

A product obtained by the Fisher method (above described), and having a potency of approximately 566% of standard and consisting of 5.426 grams, was dissolved in 250 ml. 0.05 N HCl. This solution was adjusted to pH 2.56 with 8.0 milliequivalents of sodium hydroxide (0.5 N and 0.05 N NaOH). Pepsin in the amount of 0.020 gm. (1:55,000) in 10 ml. 0.05 N HCl was added, the final volume being adjusted to 271 ml. with 4 ml. 0.05 N HCl. The material was digested at 38° C. for two hours and the sample then heated to 95° to 100° C. for fifteen minutes to stop the digestion and inactivate the pepsin. After bringing the sample to room temperature, the volume was adjusted to 270 ml. with distilled water.

54 ml. of freshly prepared 30% trichloroacetic acid was added to the above and the sample was then centrifuged for thirty minutes at room temperature. The supernatant containing the trichloroacetic acid was then washed ten times with 1 liter aliquots of U. S. P. diethyl ether. The ether was then removed by heat and suction.

The sample was dialyzed by placing it in a cellophane bag (a Visking cellophane tubing) having the two ends closed for one hour and ten minutes in 5 volumes of distilled water at room temperature. The final pH was 2.75 at 25° C. The sample was then shell-frozen and lyophilized. The total recoveries were as follows:

| | |
|---|---|
| Total solids _____gm. __ | 1.21 |
| Percent recovered total solids _____ | 22.3 |
| Standard potency _____percent of standard__ | 2683 |
| Percent recovered standard _____ | 98.5 |

The product was 27 times as potent as standard.

*Example 2*

The sample was the product obtained by the Fisher method and consisted of 5.01 grams, the starting material having a potency of approximately 419% standard. The steps were substantially the same as described in Example 1. The dialysis time was one hour and the total solids recovered were 1.42 grams, representing a per cent of total solids recovered of 28.4. The potency was 2500% of standard or 25 times standard.

*Example 3*

The starting material was a product obtained by the Fisher method and having a potency of approximately 1510% (standard). The sample consisted of 7.40 grams and the treatment was substantially as described in Example 1. The dialysis time, however, was 0.5 hour. The total solids recovered was 2.94 grams, representing a per cent of the total solids of 39.8%. The potency was 4400% of standard, representing an increase in potency over the starting material of 2.9 or 44 times standard.

*Example 4*

The starting material was a hog acid acetone powder having a potency of 86±32% (standard). A 1% solution containing 1.51 grams of this starting material was treated using substantially the same steps as described in Example 1. The dialysis time was one hour and the total solids recovered were 1.18 grams, representing a per cent of total solids recovery of 78. The potency was 186±99% (standard).

*Example 5*

I prepared a 0.5 to 3% water suspension of an acetone powder containing the adrenocorticotrophic hormone substance (in similar operation I employed a semi-purified fraction of the anterior pituitary glands of hogs, cattle and sheep with like results). The pH of the suspension was adjusted to 4.0 with acetic acid. I then added 3.7 mg. of 1:55,000 pepsin per gram of suspended solids to the material and the digestion was carried out at a temperature of 38° C. for a little over two hours. The mixture was then heated to about 100° C. for about fifteen minutes to destroy the enzyme and the temperature was then allowed to drop to about room temperature. Trichloroacetic acid was then added to precipitate out the inert proteins while retaining the hormone substance in the supernatant solution. In this test, I employed 3 grams of the trichloroacetic acid per gram of the solids.

The supernatant solution was then washed with ether (diethyl ether) to remove the contaminating substances, such as trichloroacetic acid. 30 volumes of the ether were used and the washed supernatant substance was then dialyzed in an ordinary Visking cellophane tube. The dialysis was carried out at about room temperature for one hour. The material not passing through the membrane was lyophilized to form the final product.

*Example 6*

I prepared a 0.5 to 3% water suspension of an acetone powder containing the adrenocorticotrophic hormone substane (in similar operations I employed a semi-purified fraction of the anterior pituitary glands of hogs, cattle and sheep with like results). The pH of the suspension was adjusted to 2.5 with hydrochloric acid. I then added 3.7 mg. of 1:55,000 pepsin per gram of suspended solids to the material and the digestion was carried out at a temperature of 38° C. for a little over two hours. The mixture was then heated to about 100° C. for about fifteen minutes to destroy the enzyme and the temperature was then allowed to drop to about room temperature. Trichloroacetic acid was then added to precipitate out the inert proteins while retaining the hormone substance in the supernatant solution. In this test, I employed 3 grams of the trichloroacetic acid per gram of the solids.

The supernatant solution was then washed with ether (diethyl ether) to remove the contaminating substances, such as trichloroacetic acid. 30 volumes of the ether were used and the washed supernatant substance was then dialyzed in an ordinary Visking cellophane tube. The dialysis was carried out at about room temperature for one hour. The material not passing through the membrane was lyophilized to form the final product.

*Example 7*

The starting material was a product obtained by the Fisher method and having a potency of approximately 1500% (standard). The sample consisted of 0.20 gm. and the treatment was substantially as described in Example 6. Acetic acid, however, was used in the pepsin digestion step. The dialysis time was 0.5 hours in 10 volumes of water. The total solids recovered was 0.05 gm. representing a per cent of the total solids of 25%. The potency was 2800% of standard, or it was 28 times as potent as the standard. This represents an increase in potency over the starting material of 1.9.

*Example 8*

The starting material was a product obtained by the Fisher method and having a potency of approximately 2300% (standard). The sample consisted of 0.20 gm. and the treatment was substantially as described in Example 6. Cathepsin, however, was used instead of pepsin and the enzymatic digestion was carried out at pH 3.45 at 37° C. The dialysis time was 1.0 hour in 10 volumes of water. The total solids recovered was 0.019 grams representing a per cent of the total solids of 9.5%. The potency was 10,300% of standard, representing an increase in potency over the starting material of 4.5.

*Example 9*

The starting material was a product obtained by the Fisher method and having a potency of approximately 800% (standard). A 2% solution which was peptically digested and heated to 95 to 100° C. as in Example 1, was then dialyzed for 23 hours in two changes of water at 40° F. The dialysate then was adjusted to pH 5.2 with 0.5 milliequivalents of sodium hydroxide, shell frozen and lyophilized. The total solids recovered were 0.40 gram, representing a per cent of total solids recovery of 80. The potency was 1100% (standard).

*Example 10*

The starting material was a clinical sample of ACTH and having a potency of 732±248% (Standard). A 1% solution containing 0.233 gram of this starting material was treated using substantially the same steps as described in Example 1. The dialysis time was one hour, the total solids recovered were 0.159 gram, representing a per cent of total solids recovery of 68. The potency was 600± 285% (standard).

Experiments on products corresponding to those treated in the above examples were made with respect to dialysis time. The tests indicated that, in order to obtain the maximum amount of activity, it was desirable to keep the dialysis time within the range of one-half hour to two hours, and preferably at about one hour or lower. It will be noted that in the above Example 9, the step of treating a trichloroacetic acid was omitted and the desired product was obtained as a dialysate after a prolonged dialysis step. I prefer to carry through the dialysis for a period of from 12 to 24 hours during which time the mass of the active material is found to have passed through the membrane.

While in the foregoing specification I have set forth certain steps of procedure in considerable detail for the purpose of illustrating embodiments of the invention, it will be understood that such details may be varied widely by those skilled in the art without departing from the spirit of the invention.

I claim:

1. In a process for treating a protein-containing extract of an adrenocorticotrophin hormone substance extracted from anterior pituitary glands and which has not previously been subjected to enzyme hydrolysis, the steps of digesting the substance with a proteolytic enzyme selected from the group consisting of pepsin and cathepsin, adding trichloroacetic acid to precipitate the inert material, washing the unprecipitated material with a solvent selected from the group consisting of ether, benzene, and toluene for the removal of trichloroacetic acid, and dialyzing the remaining material containing the active substance.

2. In a process for treating a protein-containing extract of an adrenocorticotrophin hormone substance extracted from anterior pituitary glands and which has not previously been subjected to enzyme hydrolysis, the steps of digesting the substance with pepsin, treating the digested material with trichloroacetic acid to precipitate inert material, washing the unprecipitated material with a solvent selected from the group consisting of ether, benzene, and toluene to remove the trichloroacetic acid, and dialyzing the remaining material.

3. In a process for treating a protein-containing extract of an adrenocorticotrophin hormone substance extracted from anterior pituitary glands and which has not previously been subjected to enzyme hydrolysis, the steps of digesting the substance with cathepsin, treating the digested material with trichloroacetic acid to precipitate inert material, washing the unprecipitated material with a solvent selected from the group consisting of ether, benzene, and toluene to remove the trichloroacetic acid, and dialyzing the remaining material.

4. In a process for treating a protein-containing extract of an adrenocorticotrophin hormone substance extracted from anterior pituitary glands and which has not previously been subjected to enzyme hydrolysis, the steps of digesting the substance with an enzyme selected from the group consisting of pepsin and cathepsin, treating the digested material with trichloroactic acid to precipitate inert material, washing the unprecipitated material repeatedly with ether, dialyzing the remaining material, and recovering the undialyzed material.

References Cited in the file of this patent

"Recent Progress in Hormone Research," vol. VI, published 1952, by Academic Press Inc., New York city, pgs. 50–73 (pgs. 69 and 73).

Pincus: "The Hormones," vol. I, 1948; pgs. 667–673.

Li in J. Biol. Chem., vol. 149 (1943), pgs. 413–424.

Li in "Vitamins & Hormones," Vol. v, 1947; pgs. 218–221.

Li in J. A. Chem. Soc., vol. 72, June 1950; pg. 2815.

White in Physiological Reviews, October 1946; pgs. 586–588.

Ciereszko in J. Biol. Chem., Oct. 1945, pgs. 585–592,